(12) United States Patent
Chen (10) Patent No.: US 9,791,978 B2
(45) Date of Patent: Oct. 17, 2017

(54) OPTICAL TOUCH MODULE FOR SENSING TOUCH OBJECT AND TOUCH DETECTING METHOD THEREOF

(71) Applicant: Wistron Corporation, New Taipei (TW)

(72) Inventor: Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 100 days.

(21) Appl. No.: 14/606,025

(22) Filed: Jan. 27, 2015

(65) Prior Publication Data
US 2016/0132143 A1    May 12, 2016

(30) Foreign Application Priority Data

Nov. 7, 2014 (TW) .............................. 103138727 A (51) Int. Cl.
*G06F 3/042* (2006.01)

(52) U.S. Cl.
CPC ................................ *G06F 3/0423* (2013.01)

(58) Field of Classification Search
CPC ............................. G06F 3/0423; G06F 3/042
See application file for complete search history.

(56) References Cited

U.S. PATENT DOCUMENTS

| | | | | |
|---|---|---|---|---|
| 8,773,375 B2* | 7/2014 | Lin | ....................... | G06F 3/0428 345/173 |
| 9,098,146 B2* | 8/2015 | Yi | ....................... | G06F 3/0425 |
| 2011/0050649 A1* | 3/2011 | Newton | ................ | G06F 3/0418 345/175 |
| 2013/0044081 A1* | 2/2013 | Wu | ........................ | G06F 3/042 345/175 |
| 2013/0141389 A1* | 6/2013 | Chou | .................... | G06F 3/0425 345/175 |
| 2013/0141392 A1* | 6/2013 | Cheng | ................... | G06F 3/0428 345/175 |
| 2013/0187892 A1 | 7/2013 | Yu | | |

FOREIGN PATENT DOCUMENTS

| | | |
|---|---|---|
| CN | 102184060 | 9/2011 |
| TW | 201324282 | 6/2013 |

OTHER PUBLICATIONS

"Office Action of Taiwan Counterpart Application", dated Nov. 13, 2015, with English translation thereof, p. 1-p. 8.

* cited by examiner

*Primary Examiner* — Kwang-Su Yang
(74) *Attorney, Agent, or Firm* — Jianq Chyun IP Office (57) ABSTRACT

An optical touch module and a touch detecting method thereof are provided. The optical touch module includes a plurality of sensing components, at least one carrier component and a control unit. The sensing components are configured to sense a touch object located on a touch plane. The carrier component carries and rotates at least one of the sensing components to change sensing directions of the sensing components relative to the touch plane. The control unit is coupled to the sensing components and the carrier component and divides the touch plane into a plurality of regions based on the sensing components. The control unit controls the rotation of the carrier component to change the sensing direction of the at least one sensing component, such that the sensing components sense the regions. The control unit calculates a coordinate of the touch object according to sensing results of the sensing components.

15 Claims, 5 Drawing Sheets

OPTICAL TOUCH MODULE FOR SENSING TOUCH OBJECT AND TOUCH DETECTING METHOD THEREOF

CROSS-REFERENCE TO RELATED APPLICATION

This application claims the priority benefit of Taiwan application serial no. 103138727, filed on Nov. 7, 2014. The entirety of the above-mentioned patent application is hereby incorporated by reference herein and made a part of this specification.

BACKGROUND OF THE INVENTION

1. Field of the Invention

The invention relates to a touch module, and particularly relates to an optical touch module and a touch detecting method thereof.

2. Description of Related Art

Based on different sensing types, a touch panel can be generally categorized into a resistive touch panel, a capacitive touch panel, an optical touch panel, an acoustic-wave touch panel, and an electromagnetic touch panel. Since the touch mechanism of optical touch panels is suitable for large-sized display panels, the touch function of the large-sized display panels are mostly achieved by adopting the mechanism of optical touch control.

Figure 1:
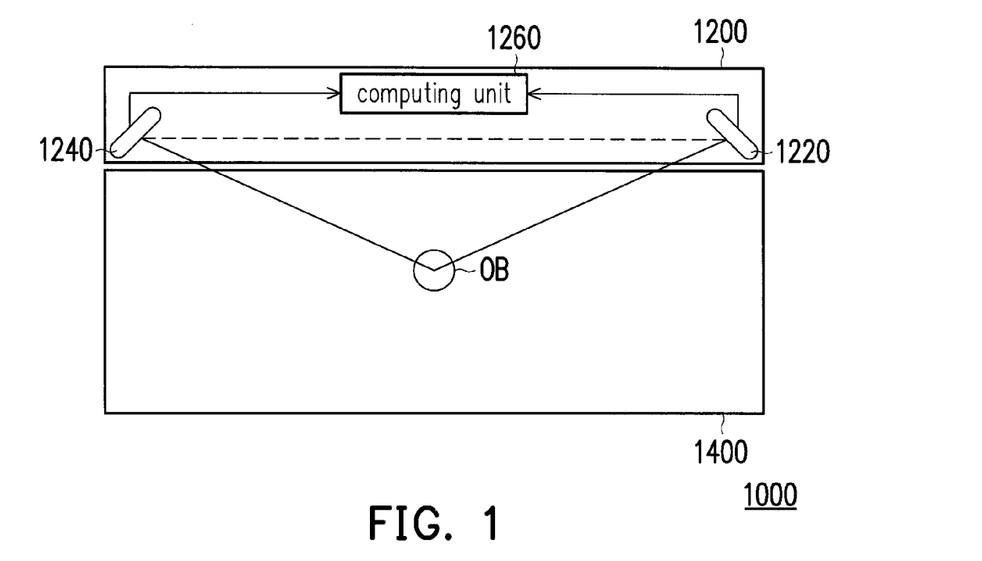
FIG. 1 is a schematic view illustrating a structure of a conventional optical touch panel.

Referring to FIG. 1 below, FIG. 1 is a schematic view illustrating a structure of a conventional optical touch panel 1000. The optical touch panel 1000 includes an optical touch module 1200 and an optical touch plane 1400. In addition, the optical touch plane 1400 is formed in front of a display panel (i.e. the display panel is located at an inner side that is perpendicular to the drawing in FIG. 1) or on an electronic whiteboard. As shown in FIG. 1, the optical touch module 1200 is disposed at one side (e.g. upper side) of the optical touch plane 1400. The optical touch module 1200 includes light sensing components 1220 and 1240 and a computing unit 1260. The light sensing components 1220 and 1240 are commonly disposed near two corners of the optical touch plane 1400. By utilizing the shade due to a shielding effect or a light spot due to a reflection effect of the touch object OB on the optical touch plane 1400, the light sensing components 1220 and 1240 may respectively sense a touch object OB. Also, the computing unit 1260 may calculate the position of the touch object OB based on sensing results of the light sensing components 1220 and 1240.

In the optical touch panel 1000, the light sensing components 1220 and 1240 need to be disposed near two corners (e.g. the upper left and right corners) of the optical touch plane 1400 to sense the whole optical touch plane 1400. Generally speaking, a configuration of the optical touch module 1200 with respect to the optical touch plane 1400 may be categorized into an embedded type and an externally connected type. For the embedded type optical touch module 1200, the light sensing components 1220 and 1240 are embedded at two corners in the sidebars of the optical touch plane 1400. Therefore, the light sensing components 1220 and 1240 at different sensing angles need to be customized to be installed in the optical touch panels 1000 in different sizes. As for the externally connected type optical touch module 1200, the light sensing components 1220 and 1240 are integrated into a single module including a circuit board and a control unit, so as to be hung at one side (e.g. the upper side) of the optical touch panel 1400 matching the length of the module without specifically modifying the structure of the display panel or electronic whiteboard serving as the optical touch plane 1400. However, for the externally connected type optical touch module 1200, when the width of the optical touch plane 1400 shown in FIG. 1 (i.e. the length of the upper or lower side of the optical touch plane 1400) is changed, the distance between the optical sensing components 1220 and 1240 (i.e. the length of the optical touch module 1200) need to be changed accordingly. Therefore, when the optical touch planes 1400 in different sizes are provided, the length of the optical touch module 1200 needs to be changed as well. Otherwise, if a shorter optical touch module 1200 is used with a wider optical touch plane 1400, the touch object OB may not be effectively sensed and thus is unable to be positioned when the touch object OB is located at two sides of the optical touch plane 1400. Under such circumstance, parts (e.g. cables and/or cases of the touch module) made in different sizes are unfavorable for the control on parts and increase the difficulty and complexity in manufacture as well. Also, the large-sized optical touch module 1200 is not convenient to carry around.

SUMMARY OF THE INVENTION

Accordingly, the invention provides an optical touch module and a touch detecting method thereof. In addition, a length of the optical touch module in the embodiments of the invention is fixed and the optical touch module is suitable for touch planes or touch panels in different sizes.

An optical touch module according of the invention includes two or more sensing components, at least one carrier component, and a control unit. The sensing components are configured to sense a touch object in a touch plane. The carrier component is configured to carry and rotate at least one sensing component to change a sensing direction of the at least one sensing components relative to the touch plane. The control unit is electrically connected to the carrier component and the sensing components. The control unit divides up and defines the touch plane into a plurality of regions based on the sensing components. The control unit controls rotation of the at least one carrier component, so as to change the sensing direction of the sensing component carried by the carrier component. In this way, the sensing components sense the regions alternately to obtain a plurality of sensing results. The control unit calculates a coordinate of the touch object in the touch plane according to the touch results.

In an embodiment of the invention, the optical touch module is disposed near one side of the touch plane, and a longest distance between the sensing components is not longer than a length of the side of the touch plane.

According to an embodiment of the invention, in the optical control module, the sensing components include a first sensing component and a second sensing component, and the regions include a first region, a second region, and a third region. In addition, the control unit controls directions of the first and second sensing components to be a first direction. The first and second sensing components simultaneously sense the first region to generate a first sensing data. The control unit controls the sensing direction of the first sensing component to be the first direction and controls the sensing direction of the second sensing component to be a second direction. The first and second sensing components simultaneously sense the second region to generate a second sensing data. The control unit controls the sensing directions of the first and second sensing components to be the second direction, and the first and second sensing components simultaneously sense the third region to generate a third sensing data. The control unit obtains the coordinate of the touch object in the touch plane according to the first, second and third sensing data.

According to an embodiment of the invention, in the optical control module, the sensing components include a first sensing component and a second sensing component, and the regions include a first region, a second region, and a third region. In addition, the control unit controls sensing directions of the first and second sensing components to be a first direction. The second sensing component senses the first region to generate a first sensing data. The first sensing component senses the first and second regions to generate a second sensing data. The control unit controls the sensing directions of the first and second sensing components to be a second direction. The second sensing component senses the second and third regions to generate a third sensing data. The first sensing component senses the third region to generate a fourth sensing data. The control unit obtains the coordinate of the touch object in the touch plane according to the first, second, third, and fourth sensing data.

According to an embodiment of the invention, in the optical touch module, the control unit only continuously changes the sensing direction of one of the sensing components to determine whether the touch object is in one of the regions. If it is determined that the touch object is in one of the regions, the control unit controls the sensing directions of remaining of the sensing components toward the one of the regions.

According to an embodiment of the invention, in the optical touch module, if one of the sensing components is a wide angle sensing component, the control unit does not control rotation of the wide angle sensing component but only controls rotation of other sensing components that are not wide angle sensing components.

In a touch detecting method of an optical touch module according to the invention, the optical touch module includes two or more sensing components and at least one carrier component. The at least one carrier component carries at least one sensing component to change a sensing direction of the at least one sensing components relative to a touch plane. The touch detecting method includes steps as follows: dividing up and defining the touch plane into a plurality of regions based on the sensing components; rotating at least one carrier component to respectively change the sensing direction of at least one of the sensing components carried by the at least one carrier component, such that the sensing components alternately sense the regions to obtain a plurality of sensing results; and obtaining a coordinate of a touch object in the touch plane based on the sensing results.

According to an embodiment, in the touch detecting method of the optical touch module, the optical touch module is disposed near one side of the touch plane, and a longest distance between the sensing components is not longer than a length of the side of the touch plane.

According to an embodiment, in the touch detecting method of the optical touch module, the sensing components include a first sensing component and a second sensing component, and the regions include a first region, a second region, and a third region. In addition, the step of rotating the at least one carrier component to respectively change the sensing direction of the at least one of the sensing components carried by the at least one carrier component, such that the sensing components alternately sense the regions to obtain the sensing results includes steps as follows: controlling sensing directions of the first and second sensing components to be a first direction to simultaneously sense the first region, so as to generate a first sensing data; controlling the sensing direction of the first sensing component to be the first direction and controlling the sensing direction of the second sensing component to be a second direction to simultaneously sense the second region, so as to generate a second sensing data; and controlling the sensing directions of the first and second sensing components to be the second direction to simultaneously sense the third region, so as to generate a third sensing data. Besides, the step of calculating the coordinate of the touch object in the touch plane based on the sensing results includes steps as follows: obtaining the coordinate of the touch object in the touch plane according to the first, second, and third sensing data.

According to an embodiment, in the touch detecting method of the optical touch module, the sensing components include a first sensing component and a second sensing component, and the regions include a first region, a second region, and a third region. In addition, the step of rotating the at least one carrier component to respectively change the sensing direction of the at least one of the sensing components carried by the at least one carrier component, such that the sensing components alternately sense the regions to obtain the sensing results includes steps as follows: controlling the sensing directions of the first and second sensing components to be a first direction; The second sensing component senses the first region to generate a first sensing data, and the first sensing component senses the first region and the second region to generate a second sensing data; controlling the sensing directions of the first and second sensing components to be a first direction; and the second sensing component senses the second region and the third region to generate a third sensing data, and the first sensing component senses the third region to generate a fourth sensing data. Besides, the step of calculating the coordinate of the touch object in the touch plane based on the sensing results includes steps as follows: obtaining the coordinate of the touch object in the touch plane according to the first, second, third, and fourth sensing data.

According to an embodiment of the invention, in the touch detecting method of the optical touch panel, the step of rotating the at least one carrier component to respectively change the sensing direction of the at least one of the sensing components carried by the at least one carrier component, such that the sensing components alternately sense the regions to obtain the sensing results includes steps as follows: only continuously changing the sensing direction of the at least one sensing component, so as to determine whether the touch object is in one of the regions; and if it is determined that the touch object is in one of the regions, controlling the sensing directions of remaining of the sensing components toward the one of the regions.

According to an embodiment of the invention, in touch detecting method of the optical touch module, if one of the sensing components is a wide angle sensing component, rotation of the wide angle sensing component is not controlled but only rotation of other sensing components that are not wide angle sensing components is controlled.

According to an embodiment of the invention, in touch detecting method of the optical touch module, the step of dividing up and defining the touch plane into the regions based on the sensing components includes steps as follows: providing at least one correction element capable of generating a light spot or a dark spot in the touch plane to serve as a plurality of correction points, wherein the correction points are located on orthogonal projections of the sensing components on the touch plane; and placing the touch object at the light or dark spots, such that the sensing components sense the touch object to generate a plurality of results of correction; calculating and obtaining a plurality of coordinates of the correction points based on the results of correction; and dividing up the touch plane into the regions based on the sensing components and the coordinates of the correction points.

Based on the above, in the optical touch module of the invention, the control unit divides the touch plane into the plurality of regions based on the sensing components, and the at least one sensing component is disposed on the at least one rotatable carrier component. The control unit may sequentially control the rotation of the at least one carrier component, so as to change the sensing direction of the at least one sensing component. In this way, the sensing components are able to sequentially and alternately sense whether the touch object is in the regions. Accordingly, the sensing components of the optical touch module according to the invention may not be disposed at the corner of the touch plane, and the length of the optical touch panel may be fixed, while the applicability to different sizes of touch planes may still be maintained. The manufacturing complexity and difficulty are thus reduced. In addition, by reducing the distance between the sensing components in the optical touch module, the size of the optical touch module according to the invention may be reduced and become easier to carry around.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Descriptions of the invention are given with reference to the exemplary embodiments illustrated with accompanied drawings, wherein same or similar parts are denoted with same reference numerals. In addition, whenever possible, identical or similar reference numbers stand for identical or similar elements in the figures and the embodiments.

An optical touch module according to an exemplary embodiment of the invention includes two or more sensing components, at least one carrier component, and a control unit. The sensing component is configured to sense a touch object in a touch plane. The carrier component is configured to carry and rotate the sensing component to change a sensing direction of the sensing components relative to the touch plane. The control unit is electrically connected to the carrier component and the sensing component. The control unit divides up and defines the touch plane into a plurality of regions based on the sensing components. The control unit controls rotation of the at least one carrier component, so as to change the sensing direction of the sensing component carried by the carrier component. In this way, the sensing components may sense the regions alternately to obtain a plurality of sensing results. The control unit calculates a coordinate of the touch object in the touch plane according to the touch results. The optical touch module is disposed near a side of the touch plane, and a longest distance between the sensing components is not longer than a length of the side of the touch plane.

Figure 2:
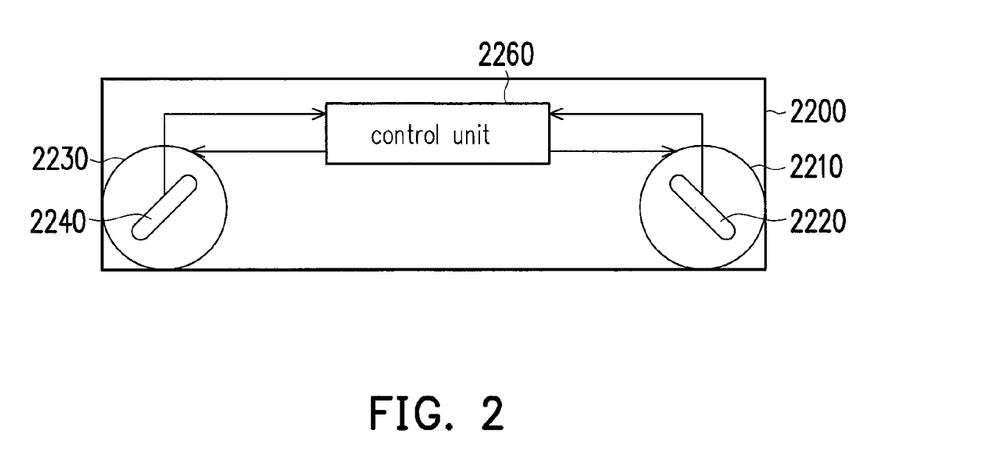
FIG. 2 is a schematic view illustrating a structure of an optical touch module according to an embodiment of the invention.
Figure 3:
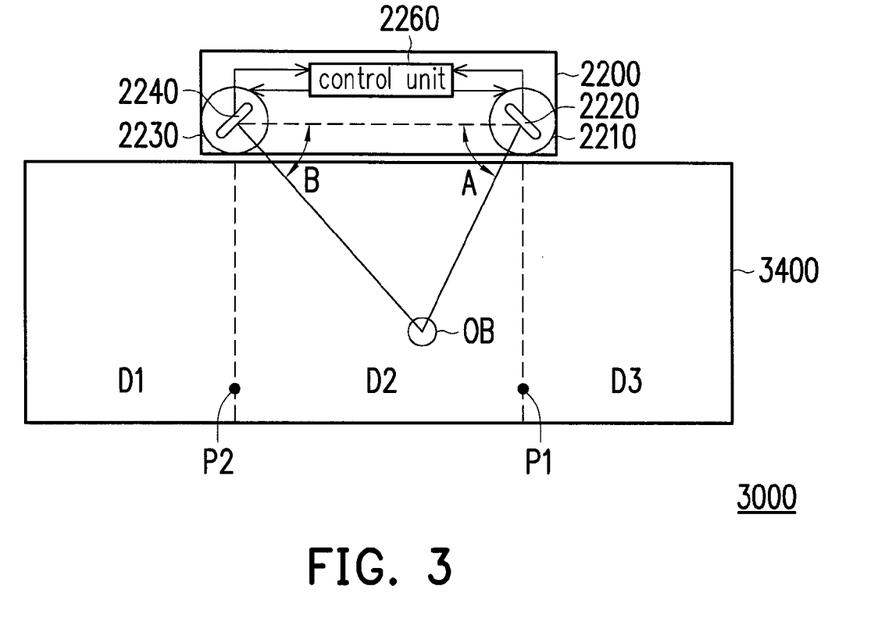
FIG. 3 is a schematic view illustrating a structure of an optical touch panel using the optical touch module shown in FIG. 2.

For the ease of description, two sensing components are used as an example for description, and details regarding the embodiments with two or more sensing components may be referred to the following and practiced accordingly. Referring to FIGS. 2 and 3 together, FIG. 2 is a schematic view illustrating a structure of an optical touch module 2200 according to an embodiment of the invention, and FIG. 3 is a schematic view illustrating a structure of an optical touch panel 3000 using the optical touch module 2200 shown in FIG. 2. The optical touch module 2200 includes sensing components 2220 and 2240, carrier components 2210 and 2230, and a control unit 2260. The sensing components 2220 and 2240 are configured to sense a touch plane 3400. The carrier components 2210 and 2230 are configured to carry and rotate the sensing components 2220 and 2240 to change sensing directions of the sensing components 2220 and 2240.

The control unit 2260 is electrically connected to the carrier components 2210 and 2230 and the sensing components 2220 and 2240. The control unit 2260 divides up and defines the touch plane 3400 into three regions D1, D2, and D3 based on the sensing components 2220 and 2240. The control unit 2260 controls rotation of the carrier components 2210 and 2230 to change the sensing directions of the sensing components 2220 and 2240, such that the sensing components 2220 and 2240 sequentially and alternately scan the regions D1, D2, and D3 of the sensing plane 3400. The control unit 2260 may calculate at least one touch object OB in the touch plane 3400 according to a plurality of sensing results of the sensing components 2220 and 2240.

The optical touch module 2220 is disposed near a side of the touch plane 3400, and a length of the optical touch module 2200 is less than a length of the side of the touch plane 3400. For example, as shown in FIG. 3, the optical touch module 2200 may be disposed near an upper side of the touch plane 3400, and the length of the optical touch module 2200 is less than a length of the upper side of the touch plane 3400. In other words, a distance between the sensing components 2220 and 2240 of the optical touch module 2200 is not longer than the length of the upper side of the touch plane 3400. If the optical touch module 2200 includes two or more sensing components, a distance between two most distant of the sensing components is not longer than the length of the upper side of the touch plane

3400. In an embodiment of the invention, the length of the optical touch module is 40 cm.

In this embodiment of the invention, the sensing components 2220 and 2240 may be a light sensing component or a camera lens. According to different sensing types of the optical touch panel 3000, the touch object OB may be a light-reflecting pen or a self-emitting object or a finger or touch pen that shields a back light source. The control unit 2260 may be realized as a microprocessor, an application specific integrated circuit (ASIC), or a field programmable gate array (FPGA). However, the invention is not limited thereto. The control unit 2260 may transmit a coordinate of the touch object OB to an external device (e.g. a computer, not shown) through an interface (e.g. an universal serial bus (USB) interface), so as to perform a subsequent process, such as moving a cursor on a display screen, drawing a line, or choosing an icon on the display screen, etc., for example.

In this embodiment of the invention, the control unit 2260 may calculate the coordinate of the touch object OB in the touch plane 3400 by using a triangulation method. As shown in FIG. 3, the sensing components 2220 and 2240 and the touch object OB form a triangle, and the distance between the sensing components 2220 and 2240 is a fixed value. Therefore, angles A and B of the triangle may be obtained by sensing the touch object OB using the sensing components 2220 and 2240 respectively. In this way, the coordinate of the touch object OB in the touch plane 3400 may be calculated.

In this embodiment of the invention, the optical touch module 2220 further includes a plurality of light emitting components (not shown). For example, the light emitting components may be LED modules. However, the invention is not limited thereto. The light emitting components may provide light of the touch plane, and are respectively disposed on the carrier components 2210 and 2230 In this way, when the directions of the sensing components 2220 and 2240 are changed according to the rotation of the carrier components 2210 and 2230, directions of the light emitting components are also changed. In other words, the light emitting components are a directional light source. However, the invention is not limited thereto. In other embodiments of the invention, the light emitting components may also be directly disposed on a periphery of the touch plane 2300, so as to provide a uniform surface light source.

In this embodiment of the invention, an angle of view of the sensing components 2220 and 2240 are 100 degrees. In addition, an angle of rotation of the sensing components 2220 and 2240 through the carrier components 2210 and 2230 is 90 degrees. However, the invention is not limited thereto. In other embodiments of the invention, one of the sensing components 2220 and 2240 may be a wide angle sensor. In other words, a sensing range of one of the sensing components (e.g. the sensing component 2220) may cover the whole touch plane 3400, while the view angle of another sensing component (e.g. the sensing component 2240) is 100 degrees. In this way, only the sensing component 2240 needs to be rotated. Besides, in other embodiments of the invention, the angle of rotation of the sensing components 2220 and 2240 through the carrier components 2210 and 2230 may be greater or less than 90 degrees, as long as a sensible range of the sensing components 2220 and 2240 through rotation covers the whole touch plane 3400.

Besides, in another embodiment of the invention, the optical touch module 2200 shown in FIG. 3 may also be disposed at an upper right corner of the touch plane 3400. Namely, a right side of the optical touch module 2200 may be near a right side of the touch plane 3400. However, the invention is not limited thereto. In yet another embodiment of the invention, the optical touch module 2200 shown in FIG. 3 may also be disposed on an upper left corner of the touch plane 3400. Namely, a left side of the optical touch module 2200 is near a left side of the touch plane 3400.

Figure 4A:
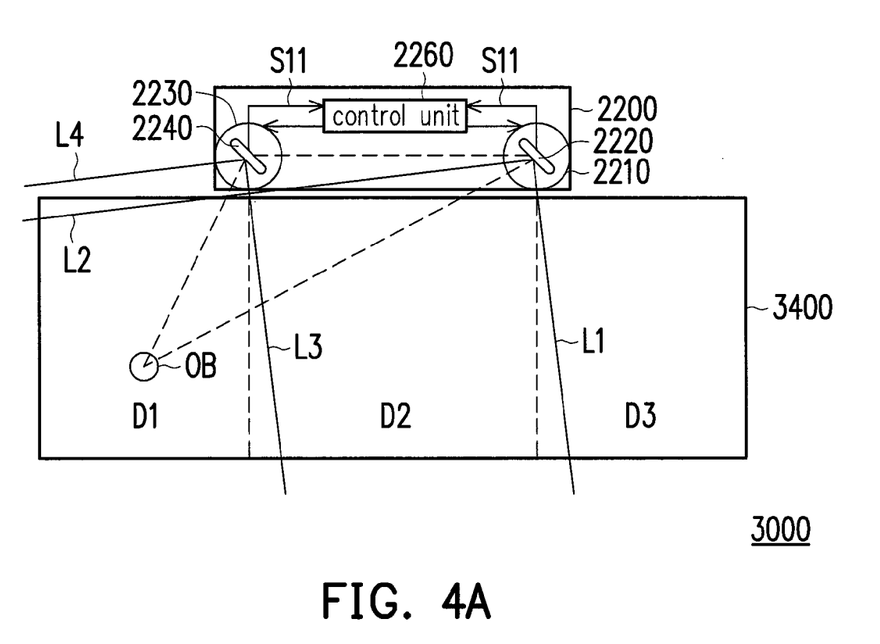
FIGS. 4A to 4C are schematic views showing processes that sensing directions of sensing components shown in FIG. 3 are changed to detect regions of a touch plane according to an embodiment of the invention.
Figure 4B:
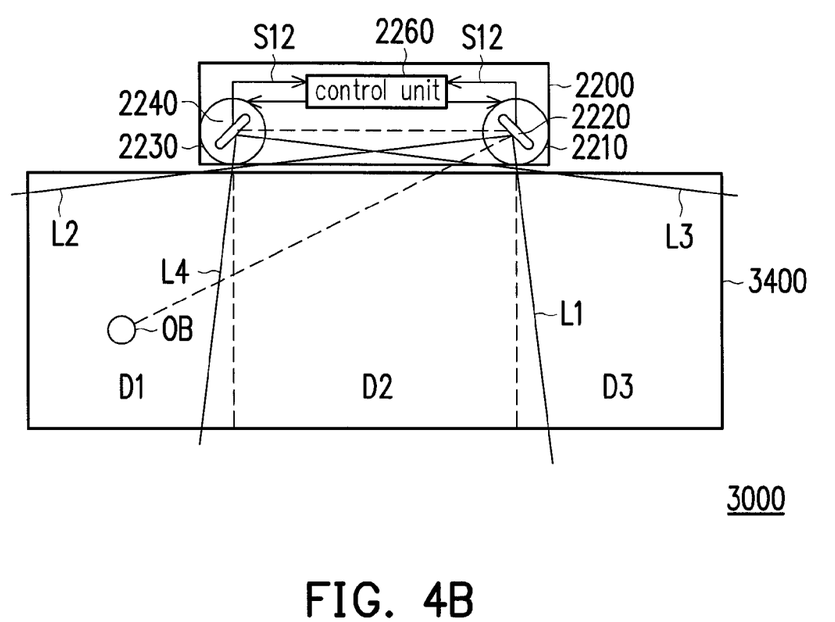
Figure 4C:
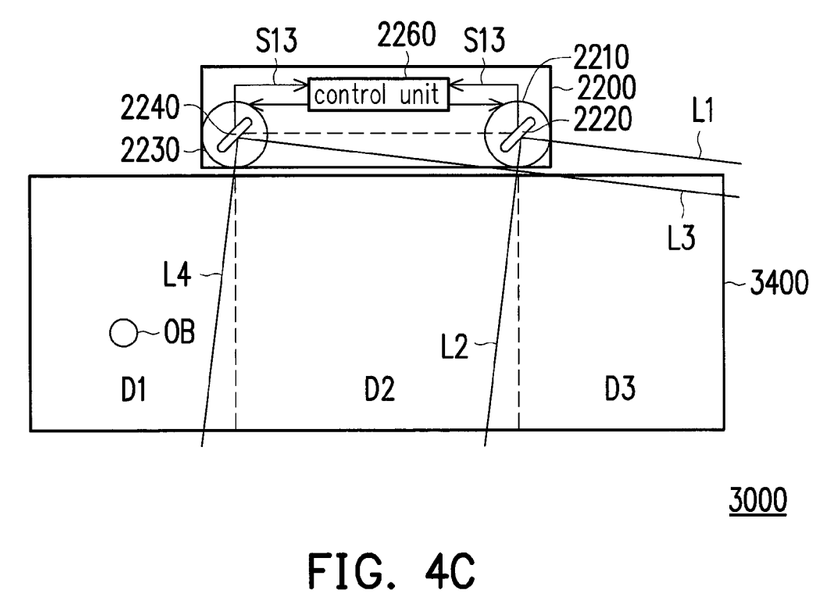

Referring to FIGS. 4A to 4C, FIGS. 4A to 4C are schematic views showing processes that the sensing directions of the sensing components 2220 and 2240 shown in FIG. 3 are changed to detect the three regions D1, D2, and D3 of the touch plane 3400 according to an embodiment of the invention.

As shown in FIG. 4A, the control unit 2260 may control the sensing directions of the sensing components 2220 and 2240 to be a first direction by using the carrier components 2210 and 2230. In other words, the sensing components 2220 and 2240 are toward the left side of the touch plane 3400. In this way, the sensing components 2220 and 2240 may simultaneously sense the region D1 to generate a first sensing data S11. In addition, an area formed by lines L1 and L2 in the touch plane 3400 is a sensible range of the sensing component 2220. An area formed by lines L3 and L4 in the touch plane 3400 is a sensible range of the sensing component 2240. Since the touch object OB is located in the region D1 in the touch plane 3400, the touch object OB is sensed and positioned by the sensing components 2220 and 2240.

Then, as shown in FIG. 4B, the control unit 2260 may keep a direction of the sensing component 2220 toward the first direction, namely keep the sensing component 2220 toward the left side of the touch plane 3400. The control unit 2260 may control the carrier component 2230 to rotate, so as to change a direction of the sensing component 2240 to a second direction, namely the sensing component 2240 is toward the right side of the touch plane 3400. In this way, the sensing components 2220 and 2240 may simultaneously sense the region D2 to generate a second sensing data S12. In addition, the area formed by the lines L1 and L2 in the touch plane 3400 is the sensible range of the sensing component 2220. The area formed by the lines L3 and L4 in the touch plane 3400 is the sensible range of the sensing component 2240. Since the touch object OB is located in the region D1 of the touch plane, the touch object OB is sensed and positioned by the sensing component 2220 only.

Then, as shown in FIG. 4C, the control unit 2260 may keep the direction of the sensing component 2240 toward the second direction, namely keep the sensing component 2240 toward the right side of the touch plane 3400. In addition, the control unit 2260 may control the carrier component 2210 to rotate, so as to change the direction of the sensing component 2220 to the second direction, namely the sensing component 2220 is toward the right side of the touch plane 3400. In other words, under such circumstance, the control unit 2260 controls the directions of the sensing components 2220 and 2240 to be the second direction. In this way, the sensing components 2220 and 2240 may simultaneously sense the region D3 to generate a third sensing data S13. In addition, the area formed by the lines L1 and L2 in the touch plane 3400 is the sensible range of the sensing component 2220. The area formed by the lines L3 and L4 in the touch plane 3400 is the sensible range of the sensing component 2240. Since the touch object OB is located in the region D1 in the touch plane 3400, the touch object OB is unable to be sensed and positioned by the sensing components 2220 and 2240.

Finally, the control unit 2260 may obtain the coordinate of the touch object OB in the touch plane 3400 according to the first sensing data S11, the second sensing data S12, and the third sensing data S13. For example, the control unit 2260 may determine whether the touch object OB is in the region D1 according to the first sensing data S11. If it is determined that the touch object OB is in the region D1, the control unit 2260 may calculate the coordinate of the touch object OB in the region D1 according to the first sensing data S11. The way the control unit 2260 determines whether the touch object OB is in the regions D2 and D3 may be inferred based on the above. Thus, details in this respect will not be further reiterated below.

It should be noted that a sequence of changing the directions of the sensing components 2220 and 2240 described in this embodiment only serves as an example for an illustrative purpose, and the invention is not limited thereto. People having ordinary skills in the art may appropriately modify the sequence of rotation of the carrier components 2210 and 2230 based on the description above as long as the directions of the sensing components 2220 and 2240 are controlled to sense the three regions D1, D2, and D3 of the touch plane 3400.

Figure 5A:
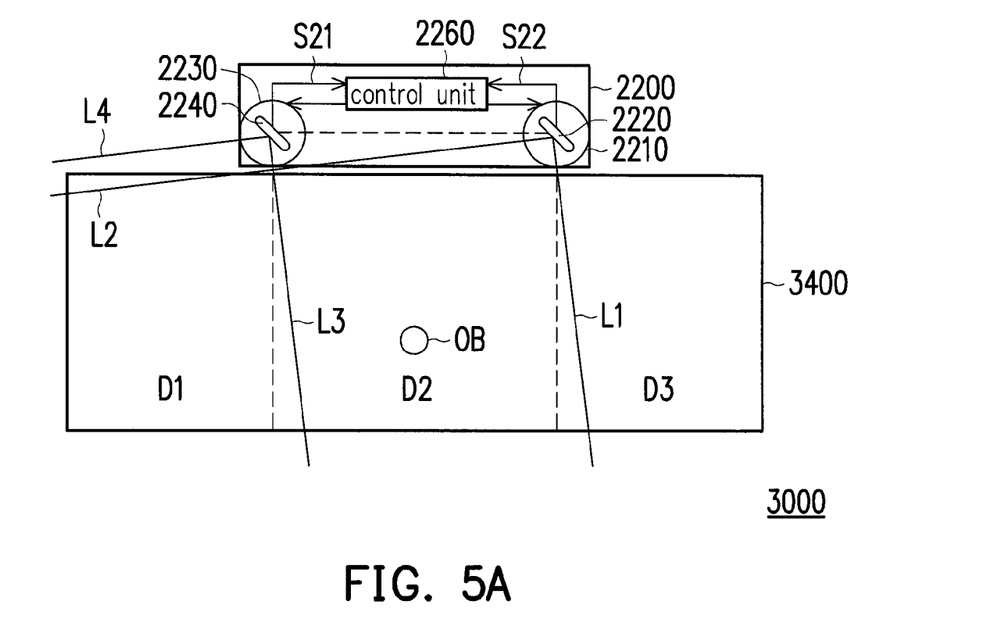
FIGS. 5A to 5B are schematic views showing processes that sensing directions of sensing components shown in FIG. 3 are changed to detect regions of a touch plane according to an embodiment of the invention.
Figure 5B:
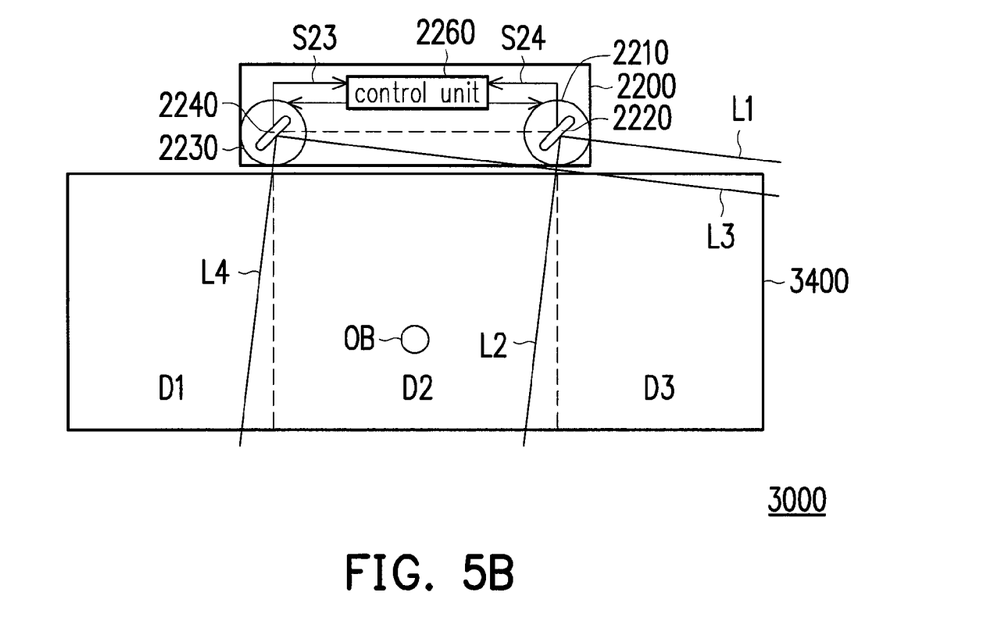

Referring to FIGS. 5A to 5B, FIGS. 5A to 5B are schematic views showing processes that the sensing directions of the sensing components 2220 and 2240 shown in FIG. 3 are changed to detect the three regions D1, D2, and D3 of the touch plane 3400 according to an embodiment of the invention. In addition, the area formed by the lines L1 and L2 in the touch plane 3400 is the sensible range of the sensing component 2220. The area formed by the lines L3 and L4 in the touch plane 3400 is the sensible range of the sensing component 2240.

As shown in FIG. 5A, the control unit 2260 controls the sensing components 2220 and 2240 to be in the first direction. In other words, the sensing components 2220 and 2240 are toward the left side of the touch plane 3400. In this way, the sensing component 2240 may sense the region D1 to generate a first sensing data S21, and the sensing component 2220 may sense the regions D1 and D2 to generate a second sensing data S22.

Then, as shown in FIG. 5B, the control unit 2260 may control the sensing components 2220 and 2240 to be in the second direction. In other words, the sensing components 2220 and 2240 are toward the right side of the touch plane 3400. In this way, the sensing component 2240 may sense the regions D2 and D3 to generate a third sensing data S23, and the sensing component 2220 may sense the region D3 to generate a fourth sensing data S24.

Then, the control unit 2260 may obtain the coordinate of the touch object OB in the touch plane 3400 according to the first sensing data S21, the second sensing data S22, the third sensing data S23, and the fourth sensing data S24.

For example, since the first sensing data S21 is generated by the sensing component 2240 sensing the region D1, and the second sensing data S22 is generated by the sensing component 2220 sensing the regions D1 and D2, the control unit 2260 may determine whether the touch object OB is in the region D1 according to data associated with the region D1 in the first sensing data S21 and the second sensing data S22. If it is determined that the touch object OB is in the region D1, the control unit 2260 may calculate the coordinate of the object OB in the region D1 according to the data associated with the region D1 in the first sensing data S21 and the second sensing data S22. The way the control unit 2260 determines whether the touch object OB is in the regions D2 and D3 may be inferred based on the above. Thus, details in this respect will not be further reiterated below. It should be noted that the sequence of changing the directions of the sensing components 2220 and 2240 described in this embodiment only serves as an example for an illustrative purpose, and the invention is not limited thereto.

In an embodiment of the invention, to reduce the number of times of rotation of the carrier components to save energy and prevent rapid aging of the carrier components, the control unit may only continuously change the sensing direction of one of the sensing components to sense/determine whether the touch object is in one of the three regions. The direction of remaining of the sensing components remains the same. Details in this respect are described below.

Referring to FIG. 3 again, the control unit 2260 may only continuously change the sensing direction of the sensing component 2240 (i.e. continuously rotating the carrier component 2230) to determine whether the touch object OB is in one of the regions D1, D2, and D3. Meanwhile, the control unit 2260 keeps the sensing direction of the sensing component 2220 unchanged (i.e. keep the carrier component 2210 still) to reduce energy consumption. If the sensing component 2240 senses the touch object OB in one of the regions D1, D2, and D3, the control unit 2260 may control the sensing component 2220 toward the one of the regions D1, D2, and D3.

For example, when the sensing component 2240 does not sense the touch object OB in one of the regions D1, D2, and D3, the control unit 2260 may keep the direction of the sensing component 2220 unchanged to reduce unnecessary power consumption. If the sensing component 2240 senses the touch object OB in the region D1 of the regions D1, D2, and D3, the control unit 2260 may control the sensing component 2220 toward the region D1 according to the sensing result of the sensing component 2240. In this way, the control unit 2260 may obtain the coordinate of the touch object OB by calculating based on the sensing results of the sensing components 2220 and 2240.

Figure 6:
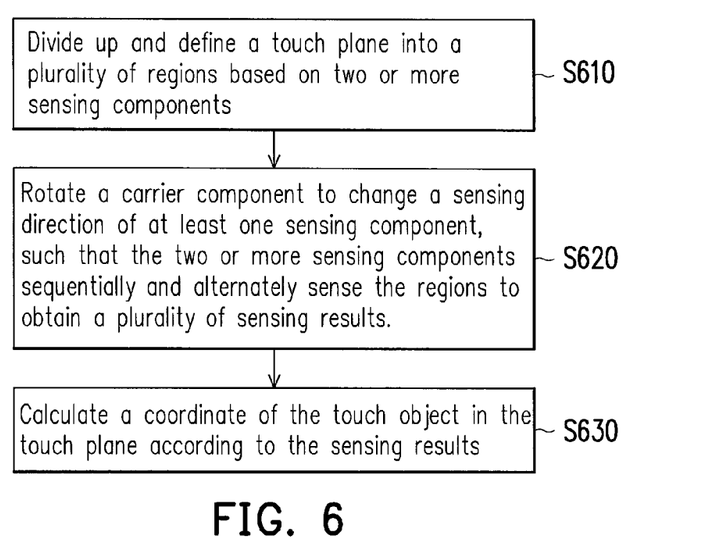
FIG. 6 is a flowchart illustrating a touch detecting method of an optical touch module according to an embodiment of the invention.

Referring to FIGS. 3 and 6 together, FIG. 6 is a flowchart illustrating a touch detecting method of an optical touch module according to an embodiment of the invention. The touch detecting method of the optical touch module according to the embodiment includes steps as follows. First of all, at Step S610, the touch plane 3340 is divided up and defined into a plurality of regions (e.g. the regions D1, D2, and D3 shown in FIG. 3) based on two or more sensing components (e.g. the sensing components 2220 and 2240 shown in FIG. 3). Then, at Step S620, a carrier component (e.g. the carrier components 2210 and 2230 shown in FIG. 3) is rotated to change a sensing direction of at least one sensing component (e.g. the sensing components 2220 and 2240 shown in FIG. 3), so as to sequentially and alternately sense the regions (e.g. the regions D1, D2, and D3 shown in FIG. 3) to obtain a plurality of sensing results. Then, at Step 630, a coordinate of a touch object (e.g. the touch object OB shown in FIG. 3) in the touch plane 3400 is calculated based on the sensing results.

Figure 7:
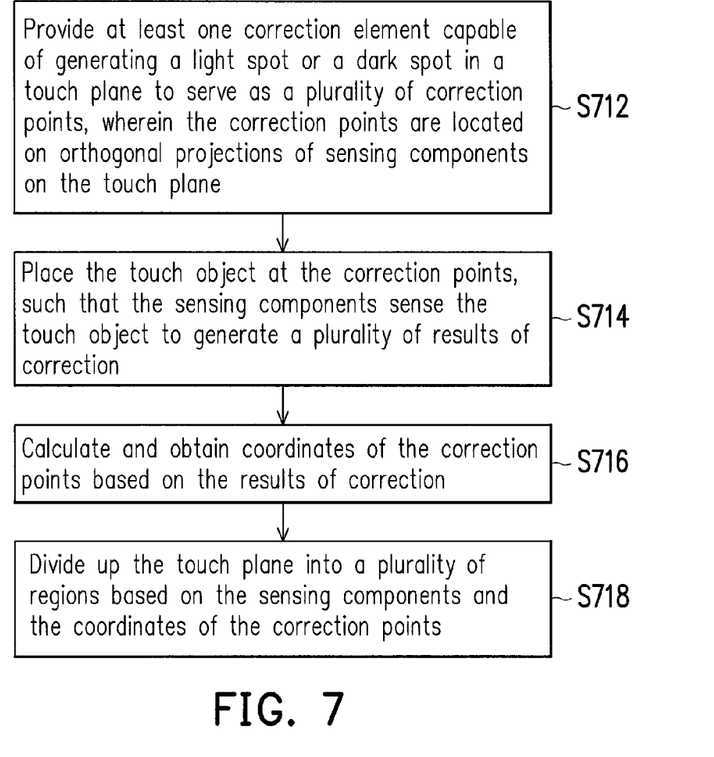
FIG. 7 is a flowchart illustrating Step S610 shown in FIG. 6 according to the invention.

Referring to FIGS. 3 and 7 together, FIG. 7 is a flowchart illustrating Step S610 shown in FIG. 6 according to an embodiment of the invention. In an embodiment of the invention, at Step S610, a method of dividing up and defining the touch plane 3400 into the plurality of regions based on the two or more sensing components (e.g. the sensing components 2220 and 2240 shown in FIG. 3) includes steps as follows. First of all, at Step S712, at least one correction element capable of generating a light spot or a dark spot is provided in the touch plane 3400 to serve as a plurality of correction points (e.g. correction points P1 and P2 shown in FIG. 3). In addition, the correction points (e.g.

correction points P1 and P2 shown in FIG. 3) are located on orthogonal projections of the sensing components (e.g. the sensing components 2220 and 2240 shown in FIG. 3) on the touch plane 3400. Then, at Step S714, the touch object OB is placed at the correction points (e.g. the correction points P1 and P2), such that the sensing components (e.g. the sensing components 2220 and 2240) sense the touch object OB to generate a plurality of results of correction. Next, at Step S716, coordinates of the correction points (e.g. the correction points P1 and P2 shown in FIG. 3) are calculated and obtained based on the results of correction. Lastly, at Step S718, based on the sensing components (e.g. the sensing components 2220 and 2240 shown in FIG. 3) and the coordinates of the correction points (e.g. the correction points P1 and P2 shown in FIG. 3), the touch plane 3400 is divided into the plurality of regions (e.g. the regions D1, D2, and D3 shown in FIG. 3). Details regarding the embodiments about other steps of the touch detecting method of the optical touch module in this embodiment of the invention are already described in the foregoing paragraphs. Therefore, details in this respect will not be further reiterated below.

In view of the foregoing, in the embodiments of the invention, the control unit divides the touch plane into the plurality of regions based on two or more sensing components, and the sensing components are disposed on the plurality of rotatable carrier components. The control unit may control the rotation of the carrier components, so as to change the sensing directions of the sensing components. In this way, the sensing components are able to sequentially and alternately sense whether the touch object is in the regions. Accordingly, the sensing components of the optical touch module according to the embodiments of the invention may not be disposed at the corner of the touch plane, and the length of the optical touch module may be fixed, while the applicability to different sizes of touch planes may still be maintained. The manufacturing difficulty is thus reduced. In addition, by reducing the distance between the sensing components in the optical touch module, the size of the optical touch module according to the embodiments of the invention may be reduced and become easier to carry around. Moreover, the modularized optical touch module may be disposed on display screens of different sizes, so that the display screens may have a touch function.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical touch module, comprising:
   two or more sensors, configured to sense a touch object on a touch plane, wherein a distance between any two of the two or more sensors is pre-defined and fixed;
   at least one carrier configured to carry and rotate at least one of the sensors to change a sensing direction of the at least one sensor relative to the touch plane while sensing the touch object; and
   a controller electrically connected to the at least one carrier and the sensors,
   wherein the controller divides up and defines the touch plane into a plurality of regions based on the sensors, controls rotation of at least one of the at least one carrier to change the sensing direction of the at least one sensor carried by the carrier while sensing the touch object, such that the sensors dynamically and automatically sense the regions alternately to obtain a plurality of sensing results, and calculates a coordinate of the touch object in the touch plane according to the sensing results.

2. The optical touch module as claimed in claim 1, wherein the optical touch module is disposed near one side of the touch plane, and a longest distance between the sensors is not longer than a length of the side of the touch plane.

3. The optical touch module as claimed in claim 1, wherein the sensors comprise a first sensor and a second sensor, and
   the regions comprise a first region, a second region, and a third region, and
   wherein the controller controls sensing directions of the first sensor and the second sensor to be a first direction and the first and second sensors simultaneously sense the first region to generate a first sensing data,
   the controller controls the sensing direction of the first to be the first direction and controls the sensing direction of the second sensor to be a second direction, and the first and second sensors simultaneously sense the second region to generate a second sensing data,
   the controller controls the sensing directions of the first and second sensors to be the second direction, and the first and second sensors simultaneously sense the third region to generate a third sensing data, and
   the controller obtains the coordinate of the touch object in the touch plane according to the first, second and third sensing data.

4. The optical touch module as claimed in claim 1, wherein the sensors comprise a first sensor and a second sensor, and
   the regions comprise a first region, a second region, and a third region,
   wherein the controller controls sensing directions of the first and second sensors to be a first direction, the second sensor senses the first region to generate a first sensing data, and the first sensor senses the first region and the second region to generate a second sensing data;
   the controller controls the sensing directions of the first and second sensors to be a second direction, the second sensor senses the second region and the third region to generate a third sensing data, and the first sensor senses the third region to generate a fourth sensing data;
   the controller obtains the coordinate of the touch object in the touch plane according to the first, second, third, and fourth sensing data.

5. The optical touch module as claimed in claim 1, wherein the controller only continuously changes the sensing direction of one of the sensors to determine whether the touch object is in one of the regions, and if it is determined that the touch object is in one of the regions, the controller controls the sensing directions of remaining of the sensors toward the one of the regions.

6. The optical touch module as claimed in claim 1, further comprising:
   a plurality of light emitting components configured to provide light for the touch plane and respectively disposed on the at least one carrier.

7. The optical touch module as claimed in claim 1, wherein an angle of view of the sensors is 100 degrees, and an angle of rotation of the sensors through the carrier is 90 degrees.

8. The optical touch module as claimed in claim 1, wherein if one of the sensors is a wide angle sensor, the controller does not control rotation of the wide angle sensor but only controls rotation of other sensors that are not wide angle sensors.

9. A touch detecting method of an optical touch module, wherein the optical touch module comprises two or more sensors and at least one carrier, a distance between any two of the two or more sensors is pre-defined and fixed, the at least one carrier carries at least one of the sensors to change a sensing direction of the at least one of the sensors relative to a touch plane while performing sensing the touch object, the touch detecting method comprising:

dividing up and defining the touch plane into a plurality of regions based on the sensors;

rotating at least one of the at least one carrier to respectively change the sensing direction of the at least one of the sensors carried by the at least one carrier while sensing the touch object, such that the sensors alternately sense the regions dynamically and automatically to obtain a plurality of sensing results; and obtaining a coordinate of a touch object in the touch plane based on the sensing results.

10. The touch detecting method of the optical touch module as claimed in claim 9, wherein the optical touch module is disposed near one side of the touch plane, and a longest distance between the sensors is not longer than a length of the side of the touch plane.

11. The touch detecting method of the optical touch module as claimed in claim 9, wherein the sensors comprises a first sensor and a second sensor, and the regions comprise a first region, a second region, and a third region, wherein the step of rotating the at least one of the at least one carrier to respectively change the sensing direction of the at least one of the sensors carried by the at least one carrier, such that the sensors alternately sense the regions to obtain the sensing results comprises:

controlling sensing directions of the first and second sensors to be a first direction to simultaneously sense the first region, so as to generate a first sensing data, controlling the sensing direction of the first sensor to be the first direction and controlling the sensing direction of the second sensor to be a second direction to simultaneously sense the second region, so as to generate a second sensing data, controlling the sensing directions of the first and second sensors to be the second direction to simultaneously sense the third region, so as to generate a third sensing data, and wherein the step of calculating the coordinate of the touch object in the touch plane based on the sensing results comprises:

obtaining the coordinate of the touch object in the touch plane according to the first, second, and third sensing data.

12. The touch detecting method of the optical touch module as claimed in claim 9, wherein the sensors comprise a first sensor and a second sensor, and the regions comprise a first region, a second region, and a third region, wherein the step of rotating the at least one of the at least one carrier to respectively change the sensing direction of the at least one of the sensors carried by the at least one carrier, such that the sensors alternately sense the regions to obtain the sensing results comprises:

controlling sensing directions of the first and second sensors to be a first direction, wherein the second sensor senses the first region to generate a first sensing data, the first sensor senses the first region and the second region to generate a second sensing data; and controlling the sensing directions of the first and second sensors to be a second direction, wherein the second sensor senses the second region and the third region to generate a third sensing data, and the first sensor senses the third region to generate a fourth sensing data;

wherein the step of calculating the coordinate of the touch object in the touch plane based on the sensing results comprises:

obtaining the coordinate of the touch object in the touch plane according to the first, second, third, and fourth sensing data.

13. The touch detecting method of the optical touch module as claimed in claim 9, wherein the step of rotating the at least one of the at least one carrier to respectively change the sensing direction of the at least one of the sensors carried by the at least one carrier, such that the sensors alternately sense the regions to obtain the sensing results comprises:

only continuously changing the sensing direction of one of the sensors to determine whether the touch object is in one of the regions, and if it is determined that the touch object is in one of the regions, controlling the sensing directions of remaining of the sensors toward the one of the regions.

14. The touch detecting method of the optical touch module as claimed in claim 9, wherein if one of the sensors is a wide angle sensor, rotation of the wide angle sensor is not controlled but only rotation of other sensors that are not wide angle sensors is controlled.

15. The touch detecting method of the optical touch module as claimed in claim 9, wherein the step of dividing up and defining the touch plane into the regions based on the sensors comprises steps as follows:

providing at least one correction element capable of generating a light spot or a dark spot in the touch plane to serve as a plurality of correction points, wherein the correction points are located on orthogonal projections of the sensors on the touch plane;

placing the touch object at the light or dark spots, such that the sensors sense the touch object to generate a plurality of results of correction;

calculating and obtaining a plurality of coordinates of the correction points based on the results of correction; and dividing up the touch plane into the regions based on the sensors and the coordinates of the correction points.

* * * * *